United States Patent

Nomura et al.

[11] Patent Number: 5,119,925
[45] Date of Patent: Jun. 9, 1992

[54] BELT CONVEYOR

[75] Inventors: Ryoichi Nomura; Kenji Nishikawa, both of Toyama, Japan

[73] Assignee: NIC Autotec Co., Ltd., Toyama, Japan

[21] Appl. No.: 583,857

[22] Filed: Sep. 17, 1990

[51] Int. Cl.⁵ .............................. B65G 23/44
[52] U.S. Cl. .................................. 198/814
[58] Field of Search ............. 198/841, 813, 814, 816

[56] References Cited

U.S. PATENT DOCUMENTS

| | | | |
|---|---|---|---|
| 1,634,187 | 6/1927 | Hartvikson | 198/814 |
| 2,759,594 | 8/1956 | Kleboe et al. | 198/814 |
| 3,144,927 | 8/1964 | Buccicone | 198/841 X |
| 3,414,115 | 12/1968 | Gates et al. | 198/814 |
| 3,718,197 | 2/1973 | Barten et al. | 198/814 X |
| 4,553,664 | 11/1985 | Buschbom et al. | 198/814 |

FOREIGN PATENT DOCUMENTS

| | | |
|---|---|---|
| 429582 | 7/1967 | Fed. Rep. of Germany. |
| 0121921 | 10/1984 | Fed. Rep. of Germany. |
| 3412995 | 10/1985 | Fed. Rep. of Germany. |
| 348044 | 5/1931 | United Kingdom. |
| 396382 | 7/1933 | United Kingdom. |
| 2017619 | 10/1979 | United Kingdom. |
| 2189757 | 11/1987 | United Kingdom. |
| 88/07489 | 6/1988 | World Int. Prop. O.. |

*Primary Examiner*—D. Glenn Dayoan
*Attorney, Agent, or Firm*—Frishauf, Holtz, Goodman & Woodward

[57] ABSTRACT

A belt conveyor comprising a drive device, a drive shaft connected to the drive device and rotated by the drive device, a driven shaft capable of rotating freely, and a first base member supporting the drive shaft at one end, a second base member supporting the driven shaft at one end, and an endless belt wrapped around the drive shaft and the driven shaft. The first and second base members can move relative to each other. The belt conveyor further comprises a bias device biasing the first and second base members away from each other, and a guide for guiding the second base member moving away from the first base member.

4 Claims, 8 Drawing Sheets

BELT CONVEYOR

BACKGROUND OF THE INVENTION

1. Field of the Invention

The present invention relates to a belt conveyor for use in an automatic assembling apparatus, designed for conveying parts, and more particularly, to a belt conveyor for use in an apparatus which automatically assembles machines or in an apparatus which automatically conveys electronic parts.

2. Description of Prior Art

Various belt conveyors are known. Among these is one designed to convey mechanical parts to an automatic assembling apparatus comprises a long base member, a first support, a second support, a drive Shaft attached to one end of the base member by the first a support, a driven shaft attached to the other end of the basic member by the second support, and an endless belt wrapped around the drive and the driven shafts. The belt may wave or slip unless a predetermined tension is applied to the belt. The waving or slipping of the belt would impair the supply of parts to the automatic assembling apparatus. In view of this, it is of vital importance to adjust the tension on the endless belt of the belt conveyor.

The longer the belt is used, the more it is elongated. The conventional belt conveyor must therefore be stopped at regular time intervals, and the tension of the belt must be adjusted each time the conveyor is stopped. The tension-adjusting mechanism, which the belt conveyor has, comprises either the second support which can slide on the base member or a portion of the base member which can slide on the other portion In order to increase the tension of the belt to a desired value, the first support or the portion of the base member is moved such that the distance between the drive shaft increases and the driven shaft, thereby tightening up the endless belt, and then is fastened by means of bolts to the base member or the other portion of the base member.

The tension of the belt gradually decreases even after it has been adjusted, as the conveyor belt is used. It may also decrease due to the loosening of the bolts or the loosening of the second support. When the tension decreases too much, the belt conveyor must be stopped, and the bolts must be loosened, the second support must be moved, tightening the endless belt, and the bolts must be tightened again. These steps of adjusting the tension of the belt are very cumbersome and requires many man-hours, particularly in the case where the belt conveyor is located within the automatic assembling apparatus or positioned between complex machines.

Another problem is inherent in the conventional belt conveyor of the type described above. In the case where the conveyor is set in a limited space, Or the tension-adjusting mechanism is located very close to any other component or another belt conveyor, it is impossible to slide the first support or the portion of the base member to increase the distance between the drive shaft and the driven shaft.

BRIEF SUMMARY OF THE INVENTION

An object of the present invention is to provide a belt conveyor in which the tension of the endless belt can be automatically adjusted, thereby applying a sufficient tension to the belt at all times.

Another object of the invention is to provide a belt conveyor in which the tension of the endless belt can be automatically adjusted by means of a simple mechanism, without changing the length of the belt conveyor.

According to an aspect of the invention, there is provided a belt conveyor which comprises two base members, a driven shaft attached to one end of the first base member, a drive shaft attached to one end of the second base member, an endless belt wrapped around the drive and driven shafts. means biasing the base members away from each other, and a guide member for guiding the base members moving away from each other.

According to another aspect of the present invention, there is provided a belt conveyor comprising: a first base member; a drive shaft fastened to the other end of the first base member; a first driven shaft fastened to one end of the first base member and spaced apart from the drive shaft by a fixed distance; an endless belt wound around the drive shaft and the first driven shaft, a second driven shaft located near the drive shaft or the first driven shaft and set in contact with the endless belt; a second base member supporting the second driven shaft; means supporting the second base member such that the second base member can move substantially in parallel to the endless belt, and biasing the second base member toward or away from the endless belt; and a guide member for guiding the second base member toward or away from the endless belt.

DETAILED DESCRIPTION OF THE PREFERRED EMBODIMENTS

Figure 1:
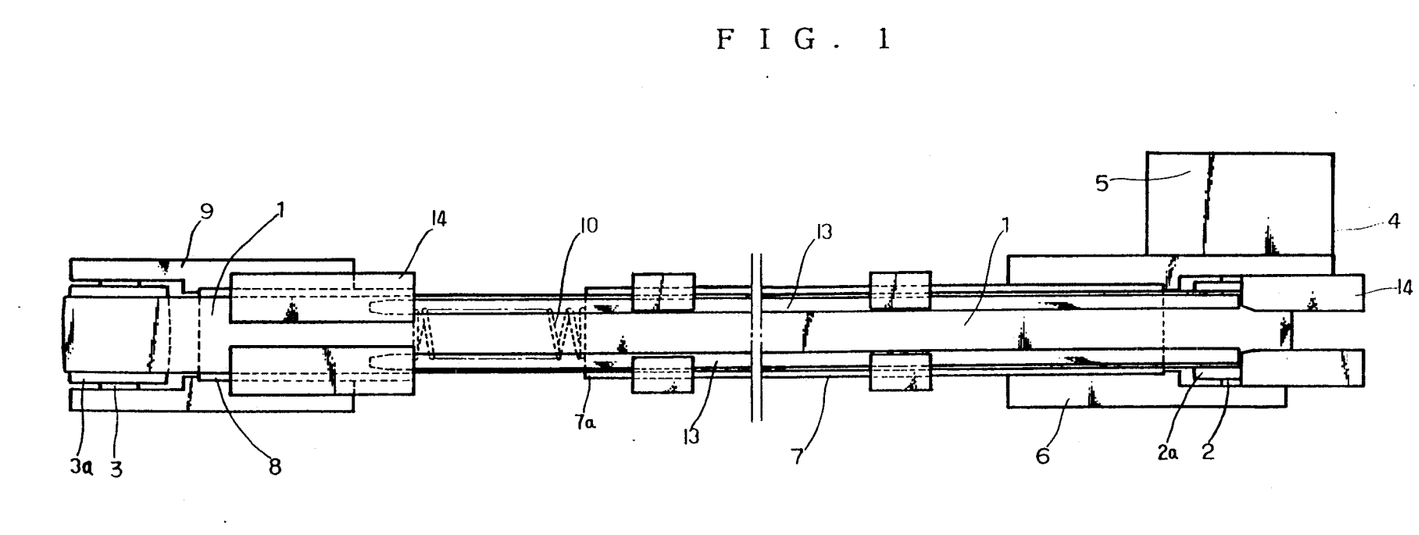
FIG. 1 is a plan view illustrating a belt conveyor according to a first embodiment of the present invention.
Figure 2:
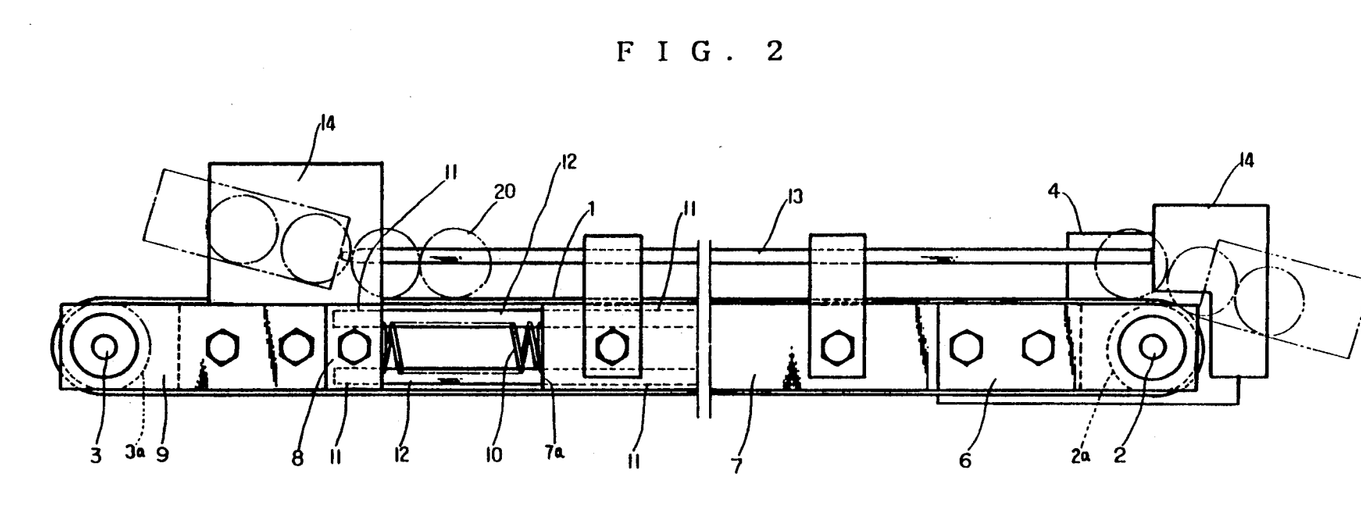
FIG. 2 is a side view showing the belt conveyor illustrated in FIG. 1.

FIG. 1 and 2 show the first embodiment of the invention, more precisely a small-sized belt conveyor for conveying mechanical components. As is illustrated in these figures, the belt conveyor comprises a drive shaft 2, a driven shaft 3, a roller 2a mounted on the drive shaft 2, a roller 3a mounted on the driven shaft 3, and an oil-resistant endless belt 1 wrapped around the rollers 2a and 3a. The drive shaft 2 is connected to a drive gear device 4 and a drive motor 5 which function as a drive device. The drive shaft 2 is rotatably supported by a first support member 6 which has a bearing (not shown). The first support member 6 is fastened to a first base member 7. A second support member 8 is located, spaced apart by a predetermined distance from the front end of the first base member 7. A second support member 9, which has a bearing (not shown), is fastend to the second base member 8. The second support member 9 has a bearing (not shown), which rotatably supports the driven shaft 3.

A coil spring 10 is interposed between the first base member 7 and the second base member 8, biasing the second base member 8 away from the first base member 7. Four through holes 11 are made in the four corners of either base member, respectively. Four guide bars 12 having a circular cross section are inserted in these through hole 12. That portion Of each guide bar 12 which is inserted in the hole 11 of the second base member 8 are secured thereto by means of pins (not shown) or the like. On the other hand, that portion of each guide bar 12 which is inserted in the through hole 11 of the first base member 7 is slidably fitted in the hole 11. The four guide bars 12 abut on the coil spring 10 and can hold the coil spring 10 not to slip out.

Two parallel guide bars 13 are connected at one end to two guide plates 14 fastened to the first base member 7, and at the other end to two guide plates 14 fastened to the second base member 8.

The operation of the belt conveyor, described above, will be described with reference to FIG. 2.

The belt conveyor is designed to convey bearings 20 from the left to the right (FIG. 2). The bearings 20 are mounted onto the belt I and conveyed from the inlet guide plate 14 to the outlet guide plate 14, while being guided by the guide bars 13.

The tension of the endless belt I changes in accordance with the weight of each bearing 20, the friction between the belt I and the rollers 2a and 3a, and changes in between the torque of the shafts 2 and 3, and the like. Nevertheless a desired tension is always applied to the endless belt I even if the belt I is elongated due to a longtime use. This is because the spring 10 biases the second base member 8 away from the first base member 7, and the second base member 8 gradually moves to the left as the endless belt i is elongated, thus compensating for the longation. As a result of this, the belt 1 remains tight. never slacken or waving.

As has been described, the tension of the endless belt 1 is maintained at an optimal value, however long the belt conveyor is used. Therefore, not only can the belt conveyor convey mechanical components smoothly, but also does it suffice to spend a short time to adjust the tension of the belt 1.

Figure 3:
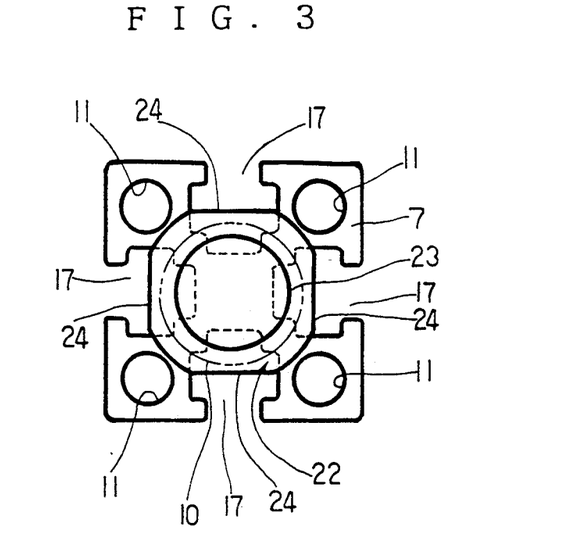
FIG. 3 is a front view of a belt conveyor according to a second embodiment of the present invention.
Figure 4:
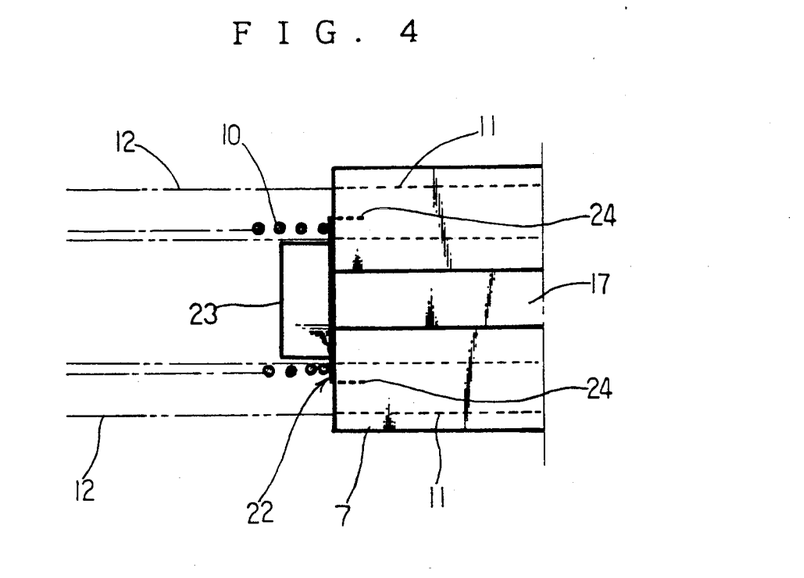
FIG. 4 is a partially sectional side view illustrating a part of the belt conveyor according to the second embodiment.

A belt conveyor according to the second embodiment of this invention will now be described with reference to FIGS. 3 and 4, in which the same reference numerals are used to designate the components similar or identical to those of the first embodiment (FIGS. 1 and 2). The similar or identical components will not be described in detail.

The second embodiment is characterized in that two spring seats 22 are attached to the opposing end faces of base members 7 and 8, respectively, and hold the ends of the coil spring !0. Either spring seat 22 has a projection 23 and four claws 24. The projection 23 is fitted in the end portion of the spring 10. The claws 24 are inserted in four grooves 17 made in the end face of the associated base member.

Since the projections 23 of the spring seats 22 are fitted in the end portions of the coil spring 10, the coil spring 10 is not displaced with respect to the base member 7 or 8, or does not slip out of the space between the base members 7 and 8, even if the coil spring 10 has a relatively small diameter.

Figure 5:
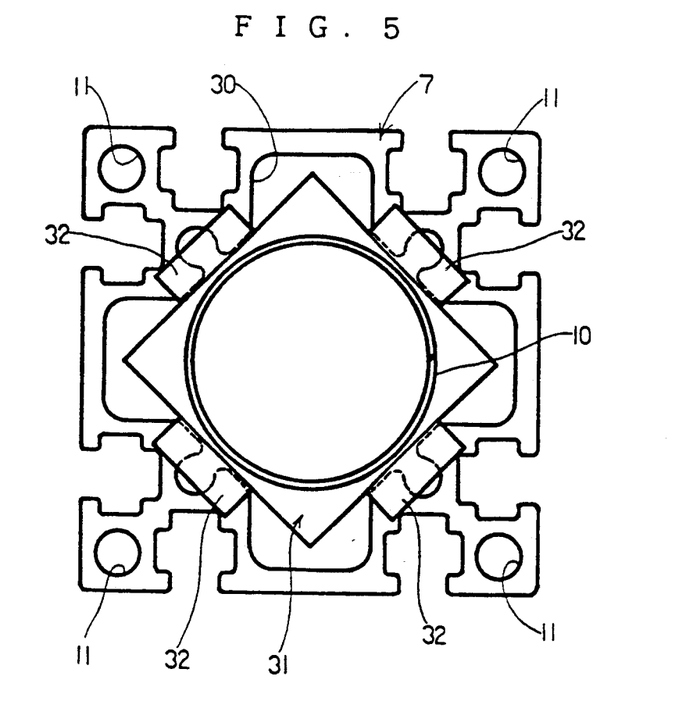
FIG. 5 is a front view showing the base members of a belt conveyor according to a third embodiment of the invention.
Figure 6:
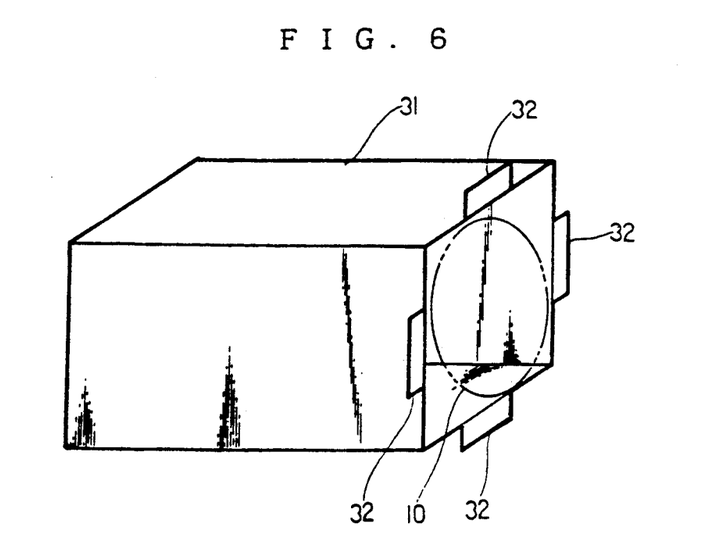
FIG. 6 is a perspective view showing the cylindrical member of the belt conveyor according to the third embodiment.

A belt conveyor according to the third embodiment of this invention will now be described with reference to FIGS. 5 and 6, wherein the same reference numerals are used to represent the components similar or identical to those of the first embodiment (FIGS. 1 and 2). The similar or identical components will not be described in detail.

The belt conveyor according to the third embodiment is characterized in two respects. First, both base members 7 and 8 are aluminum shaped bars having a center through hole 30 and the cross section specified in the through holes 30 of the base members 7 and 8, respectively. Either hollow square prism 31 has four projection 32 protruding outwardly from its open-end portion. Hence, either prism 31 is thus prevented, in its entirety, from slipping into the through hole 30 of the associated base member In the third embodiment, either prism 31 can have any length desired. regardless of the distance between the opposing ends of the base members ? and 8. It follows that the coil spring 10 can have any length desired and can thus have a sufficient expansion-contraction stroke.

Figure 7:
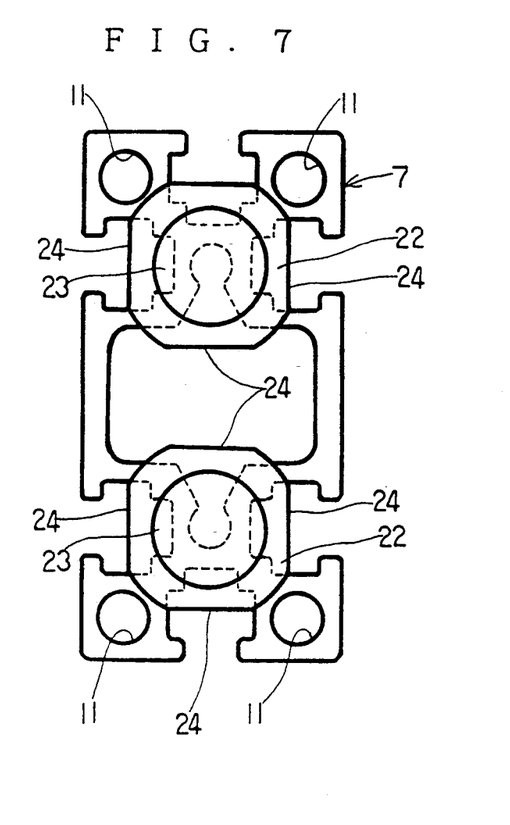
FIG. 7 is a front view showing a belt conveyor according to a fourth embodiment of the invention.

A belt conveyor according to the fourth embodiment of the invention will be described, with reference to FIG. 7 in which the same reference numerals are used to denote the components similar or identical to those of the first embodiment (FIGS. 1 and 2). The similar or identical components will not be described in detail, for simplicity of description.

This embodiment is characterized in two respects. First, a first base member 7 and a second base member 8 are each a shaped bar having the cross section specified in FIG.

Second, two spring seats 22, which are identical in shape to the seats 22 used in the second embodiment (FIGS. 3 and 4) but different in size therefrom, are attached to the end face of either base member. Hence, two coil springs (not shown) are held in place between the first base member 7 and the second base member 8. Either base member has a small with, and can yet has a sufficient mechanical strength.

Figure 8:
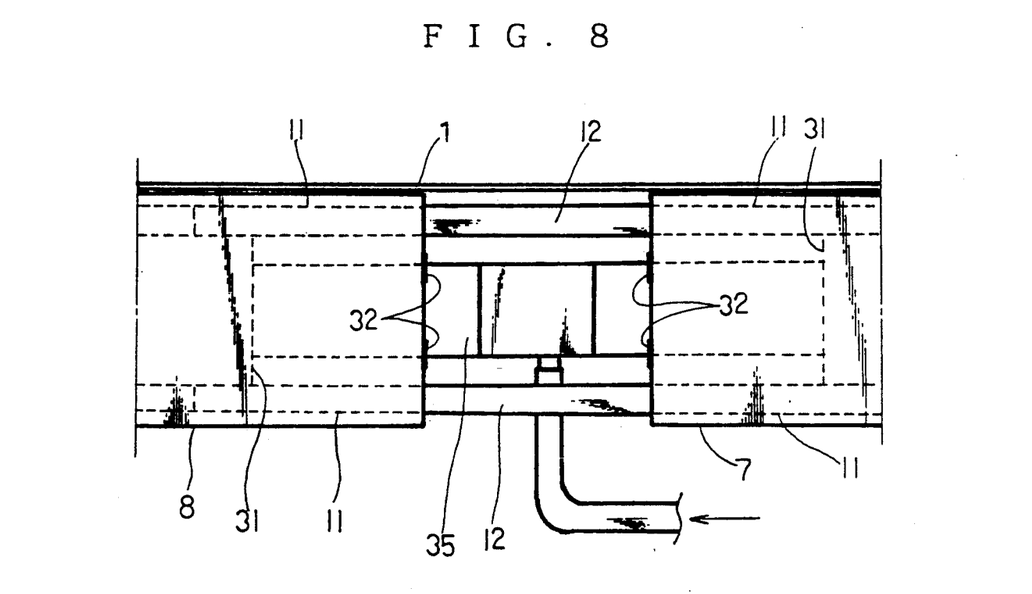
FIG. 8 is a partially sectional side view illustrating a part of a belt conveyor according to a fifth embodiment of the present invention.

A belt conveyor according to the fifth embodiment of this invention will now be described, with reference to FIG. 8, in which the same reference numerals are used to designate the components similar or identical to those of the embodiments thus far described. The similar or identical components will not be described in detail, for simplicity of description.

The fifth embodiment is characterized by the provision of an air cylinder 35 which is used as means biasing both base members 7 and 8. The air cylinder 35 is fitted in a bottomed hollow cylinder 31 and pushes the bottom thereof, thus biasing the base members 7 and 8 away from each other.

The pressure the air cylinder 35 exerts on the bottom of the cylinder 31 can be reliably controlled, provided that the air cylinder 35 is connected to an air pump (not shown) by an air pipe. The compressed air supplied into the air cylinder 35 has a constant pressure, whereas the force of the coil spring or springs 10 used in the first to fourth embodiments varies in inverse proportion to the distance between the base members 7 and 8, i.e., the length of the springs 10 compressed, which may change when the belt conveyor vibrates Hence, the air cylinder 35 can apply the endless belt I with a tension more stable than the tension which coil springs 10 applies.

A belt conveyor according to the sixth embodiment of this invention will now be described, with reference to FIGS. 9 and 10. In these figures, the same reference numerals are used to designate the components similar or identical to those of the embodiments thus far described. The similar or identical components will not be described in detail.

Figure 9:
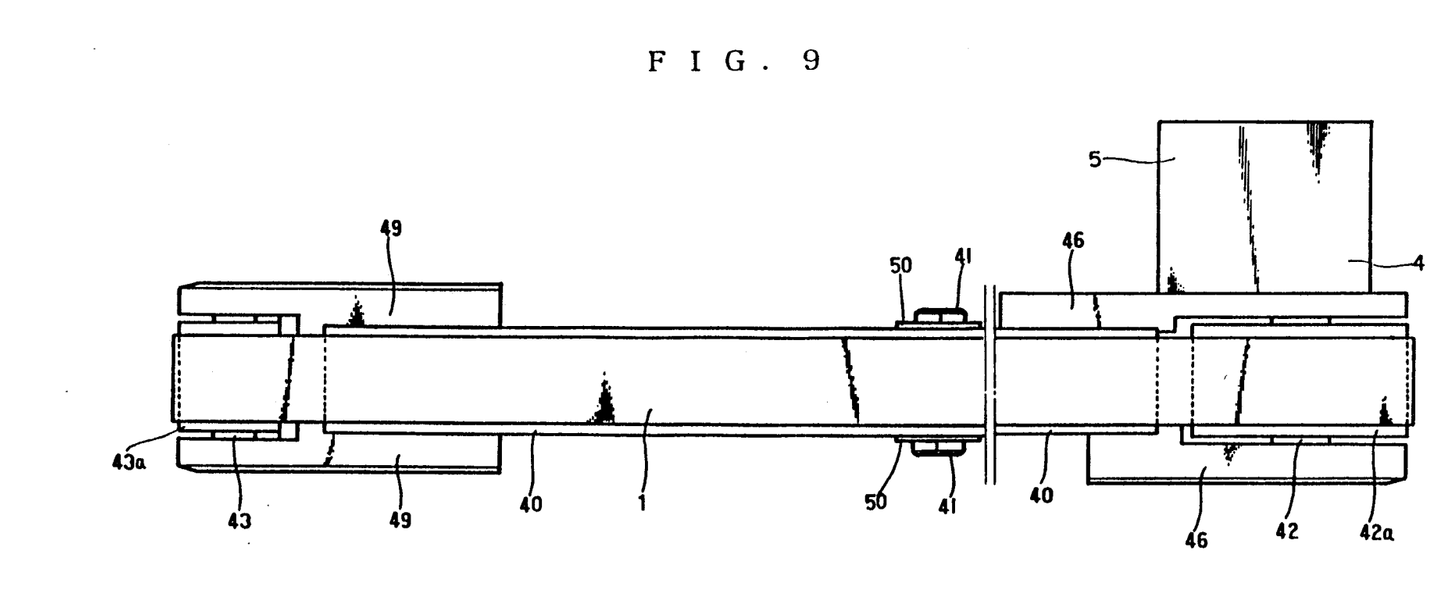
FIG. 9 is a plan view of a belt conveyor according to a sixth embodiment of the present invention.
Figure 10:
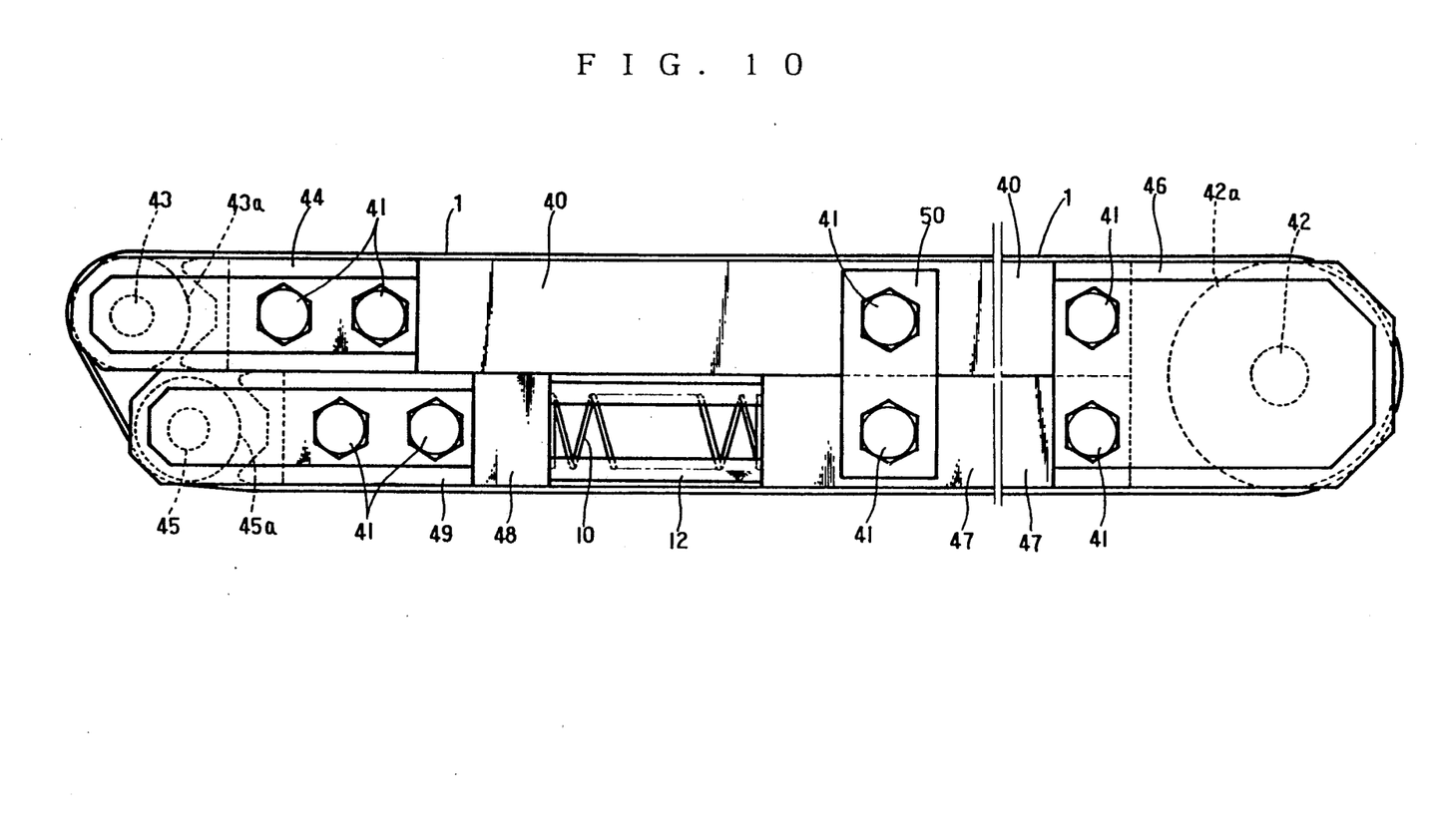
FIG. 10 is a side view illustrating the belt conveyor according to the sixth embodiment.

The belt conveyor shown in FIGS. 9 and 10 comprises a drive shaft 42, a roller 42a mounted on the drive shaft 42, a support member 46 rotatably supporting the drive shaft 42, a fixed base member 40 fastened to the support member 46 by bolts 41, a first base member 47 fastened to the support member 46 by bolts 41. A support member 44 having a bearing (not shown) is connected by bolts 41 to the forward end of the fixed base member 40. A first driven shaft 43 is rotatably supported by the bearing of the support member 44. A support member 49 having a bearing (not shown) is located below the support member 44 and fastened to a second base member 48 by means of bolts 41. A second driven shaft 45 is rotatably supported by the bearing of the support member 49, and is positioned slightly closer to the drive shaft 42 than the first driven shaft 43.

The fixed base member 40 and the second base member 48 are not connected to each other, and the first base member 47 and the second base member 48 are connected by a guide bar 12 such that they can move relative to each other. A coil spring 10 is interposed between the first base member 47 and the second base member 48, thus biasing these base members 47 and 48 away from each other. The fixed base member 40 and the first base member 47 are fastened to a connecting plate 50 by means of bolts 41.

Two rollers 43a and 45a, which has a diameter half that of the roller 42a mounted on the drive shaft 42, are mounted on the driven shafts 43 and 45, respectively. An endless belt I is wrapped around the rollers 42a, 43a, and 45a. The second driven shaft 45 is biased by the coil spring 10, substantially parallel to that portion of the belt 1 extending between the shafts 42 and 45 to increase the distance between these shafts 42 and 45. Therefore, as the belt is elongated over a long-time use, the second driven shaft 45 moves away from the drive shaft 42 by virtue of the coil spring 10, whereby the belt 1 has a predetermined tension at all times.

In the sixth embodiment shown in FIGS. 9 and 10, the coil spring 10 automatically adjust the tension of the belt I to a desired value, while maintaining the distance between the drive shaft 42 and the first driven shaft 43. Since the second base member 48 is biased to move in parallel to the axis of the fixed member 40 and hence parallel to that portion of the belt which extends between the shafts 42 and 45, the belt conveyor has a simple structure and occupies but a small space. Further, the force of the coil spring 10 changes, with little loss, into the tension of the endless belt I. In addition, with only one additional driven shaft and only one additional roller, the tension of the belt 1 can be reliably adjusted, while maintaining the length of the belt 1 can be reliably adjusted, while maintaining the length of the belt conveyor, i.e., the distance between the drive shaft 42 and the first driven shaft 43.

The present invention is not limited to the six embodiments described above. Rather, various changes and modifications can be made within the scope of the present invention For example, the means for biasing the base members away from each other can be any elastic member other than a coil spring, or by any pressure-applying component other than an air cylinder, that can exert a constant tension on the endless belt 1.

Figure 11:
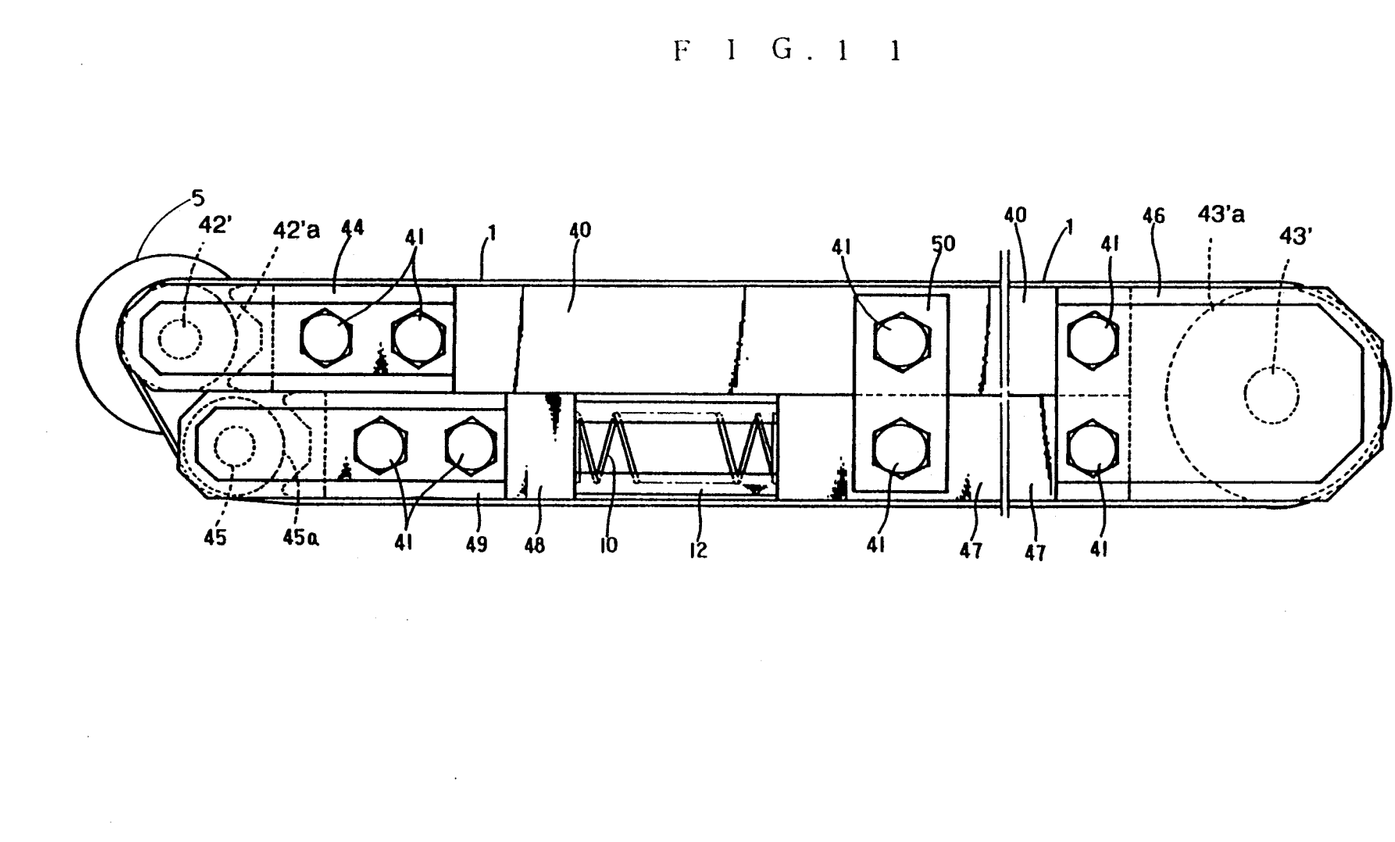
FIG. 11 shows a side view of another embodiment of the invention.

Further, as shown in FIG. 11, the second driven shaft 45 can be located near the drive shaft 42, not close to the first driven shaft 43 as in the sixth embodiment illustrated in FIGS. 9 and 10. In other words, the second driven shaft 45 can be positioned in the vicinity of either the drive shaft 42 (FIG. 11) or the first driven shaft 43 (FIG. 10). What is important in the six embodiment is that the drive shaft 42 and the first driven shaft 43 are spaced apart for a fixed distance.

Still further, in any belt conveyor according to the present invention, the bias means biases the base members supporting the drive shaft and the driven shaft, respectively, to move away from each other. Hence, a predetermined tension is always applied to the endless belt, which neither becomes wavy nor slackened.

Moreover, even if the endless belt is elongated due to a long-time use, the second base member moves away from the first base member, thus automatically increasing the tension. As a result of this, the tension remains at a desired value.

Furthermore, since the first and second base members are guided by the guide member, they Can steadily move away from each other, as the endless belt is elongated, without impairing the mechanical strength of the belt conveyor as a whole.

As has been described, in the sixth embodiment shown in FIGS. 9 and 10, the distance between the drive shaft and the first driven shaft is fixed, the second driven shaft is located near either the drive shaft or the first driven shaft, and the bias member biases the second driven shaft away from the drive shaft or the first driven shaft. Therefore, a sufficient tension can be applied to the endless belt by means of a relatively simple mechanism, without changing the length of the belt conveyor, i.e., the distance between the drive shaft and the first driven shaft.

Further, since the second driven shaft, which is located close to the drive shaft or the first driven shaft, is biased in parallel to the direction in which the endless belt wrapped around the rollers mounted on the drive shaft and the first driven shaft is driven, the bias applied to the second driven shaft can be changed, with little loss, into the tension of the endless belt. The tension exerted on the belt is, therefore, sufficient at all times.

What is claimed is:

1. A belt conveyor comprising:
   a drive device;
   a drive shaft connected to said drive device and rotated by said drive device;
   a first driven shaft capable of rotating freely, said first driven shaft being spaced from said drive shaft by a fixed distance;
   a fixed base member, supporting at one end thereof, said drive shaft and, at another end thereof, said first driven shaft;
   a first base member fastened to said fixed base member;

a second driven shaft located near and under said first driven shaft and capable of rotating freely, said second driven shaft being positioned closer to said drive shaft than said first driven shaft;

a second base member, supporting at one end thereof, said second driven shaft and capable of moving substantially parallel to a line connecting said drive shaft and said first driven shaft, said second base member extending substantially parallel to said fixed based member;

an endless belt wrapped around said drive shaft, said first driven shaft, and said second driven shaft, said first and second driven shafts being located at the inside of said endless belt, said endless belt being driven by said drive shaft;

a bias device, interposed between said first and second base members, and biasing said second base member away from said first base member in a direction which is substantially parallel to a direction in which said endless belt is driven, said bias device being arranged to bias said second base member away from said drive shaft in a direction which is substantially parallel to a line connecting said drive shaft and said first driven shaft; and guide means for guiding said second base member for moving away from said first base member;

said guide means comprising a plurality of guide bars inserted in said second base member; and said bias device being located in a space defined by said guide bars.

2. The belt conveyor according to claim 1, wherein said bias device comprises an air cylinder interposed between said first and second base members.

3. A belt conveyor comprising:

a drive device;

a drive shaft connected to said drive device and rotated by said drive device;

a first driven shaft capable of rotating freely, said first driven shaft being spaced from said drive shaft by a fixed distance;

a fixed base member supporting, at one end thereof, said drive shaft and, at anothe rend thereof, said first driven shaft;

a first base member fastened to said fixed base member;

a second driven shaft located near and under said drive shaft and capable of rotating freely, said second driven shaft being positioned closer to said first driven shaft than said drive shaft;

a second base member supporting, at one end thereof, said second driven shaft and capable of moving substantially parallel to a line connecting said drive shaft and said first driven shaft, said second base member extending substantially parallel to said fixed base member;

an endless belt wrapped around said drive shaft, said first driven shaft, and said second shaft, said first and second driven shafts being located at the inside of said endless belt, said endless belt being driven by said drive shaft;

a bias device, interposed between said first and second base member, and biasing said second base member away from said first base member in a direction which is substantially parallel to a direction in which said endless belt is driven, said bias device being arranged to bias said second base member away from said first driven shaft in a direction which is substantially parallel to a line connecting said drive shaft and said first driven shaft; and guide means for guiding said second base member for moving away from said first base member;

said guide means comprising a plurality of guide bars inserted in said second base member; and said bias device being located in a space defined by said guide bars.

4. The belt conveyor according to claim 3, wherein said bias device comprises an air cylinder interposed between said first and second base members.

* * * * *